Sept. 19, 1944.   L. FRANKEL ET AL   2,358,323
CAMERA
Filed Sept. 30, 1940   3 Sheets-Sheet 2

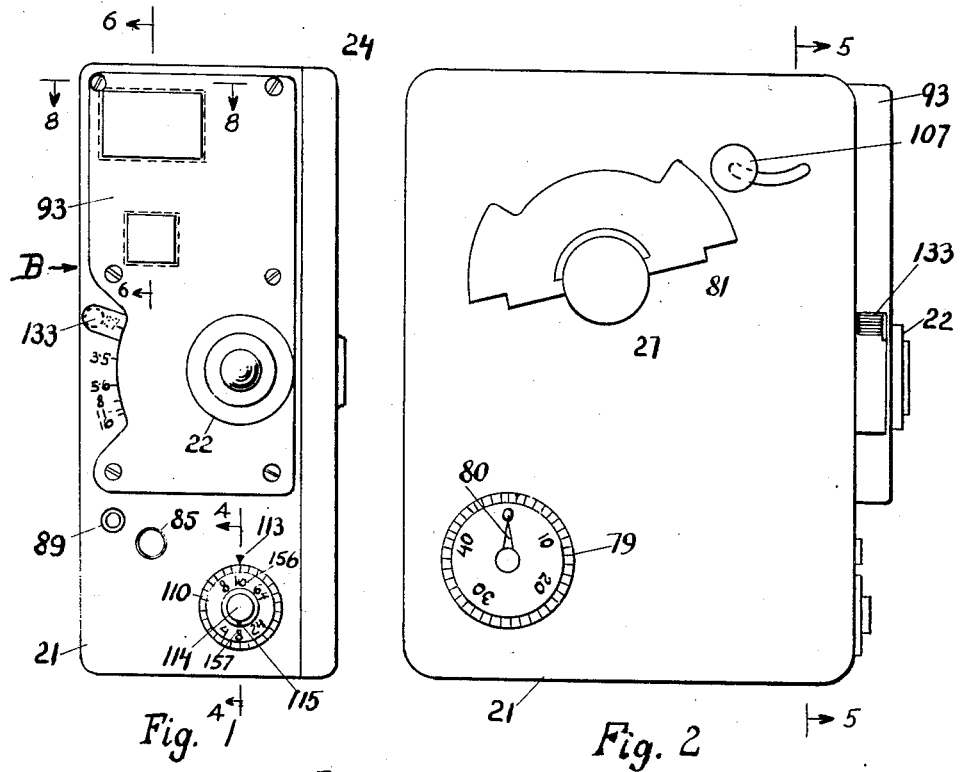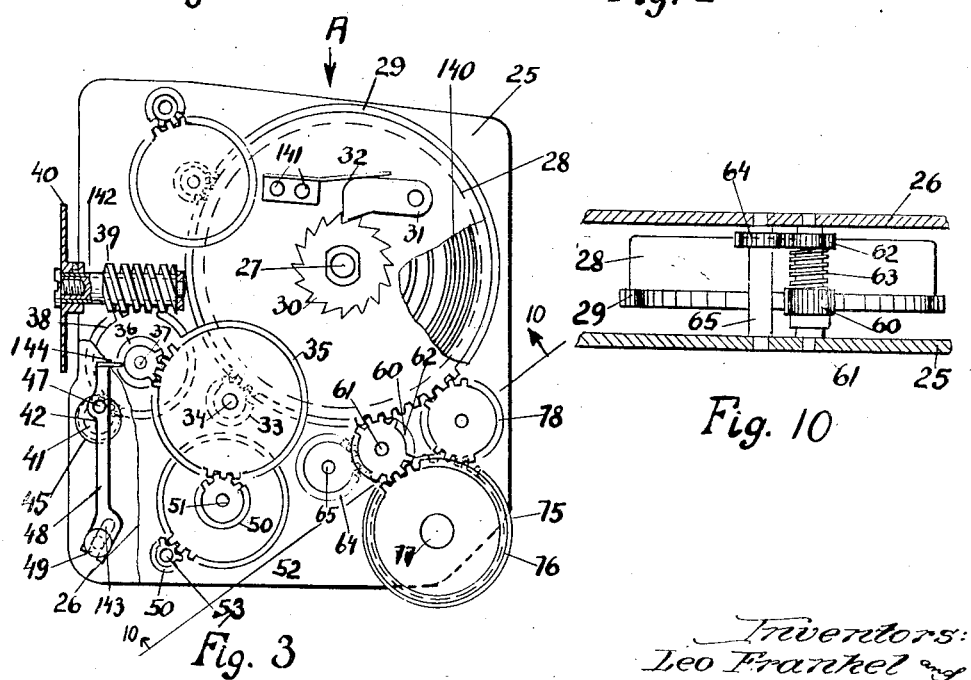

Inventors:
Leo Frankel and
Ulrich R. Furst.
By Chritton, Wiles, Davies, Hirschl & Dawson, Attys

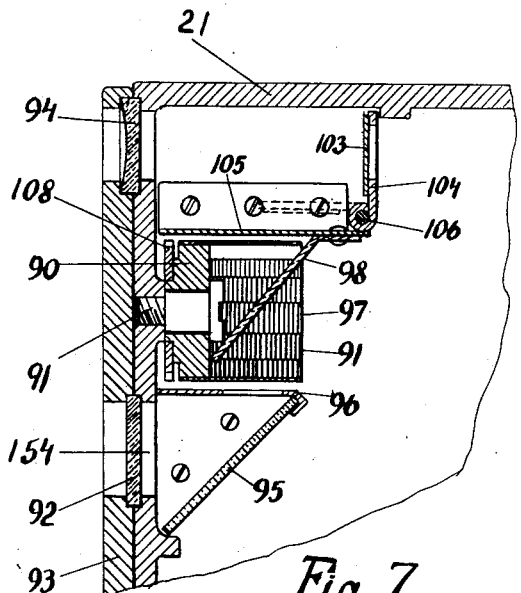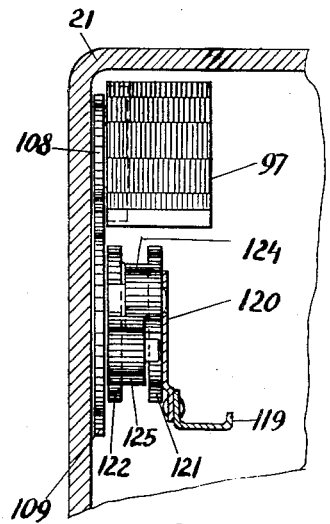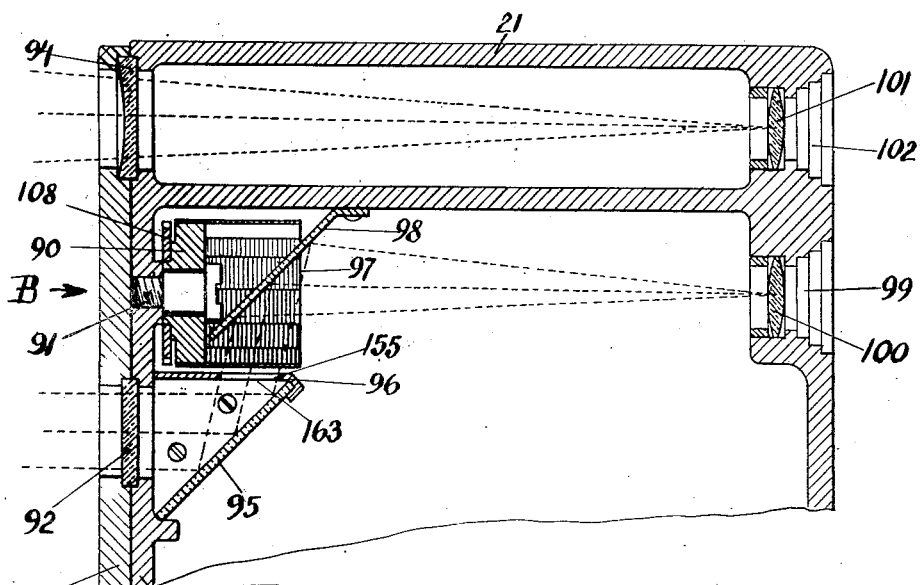

Patented Sept. 19, 1944

2,358,323

UNITED STATES PATENT OFFICE 2,358,323

CAMERA

Leo Frankel and Ulrich R. Furst, Chicago, Ill.; said Furst assignor to said Frankel Application September 30, 1940, Serial No. 359,152

14 Claims. (Cl. 95—10)

This invention relates to a camera and in particular to a motion picture camera with a coupled exposure meter.

Figure 9:
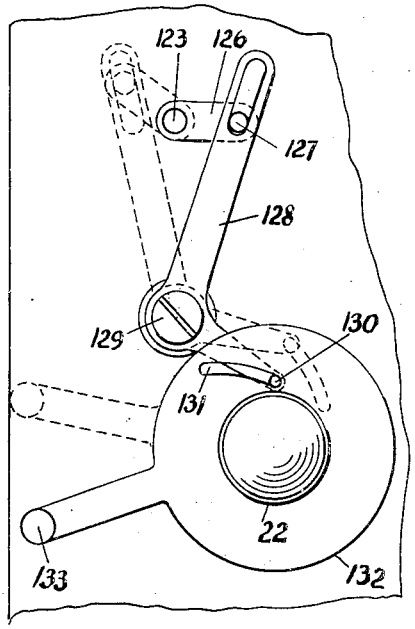
Figure 5:
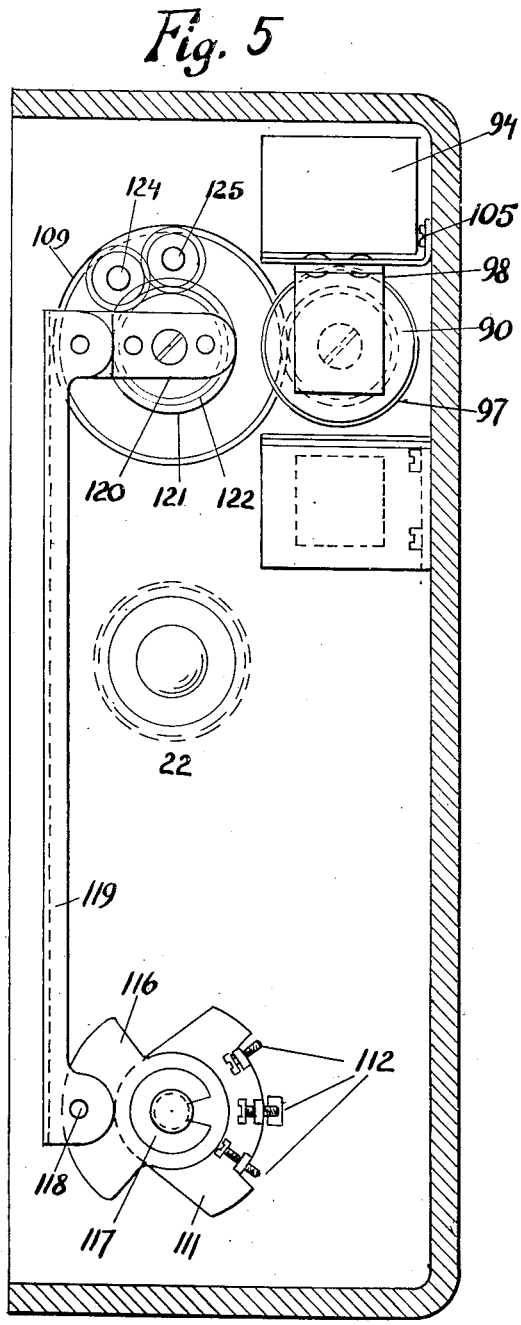
Figure 4:
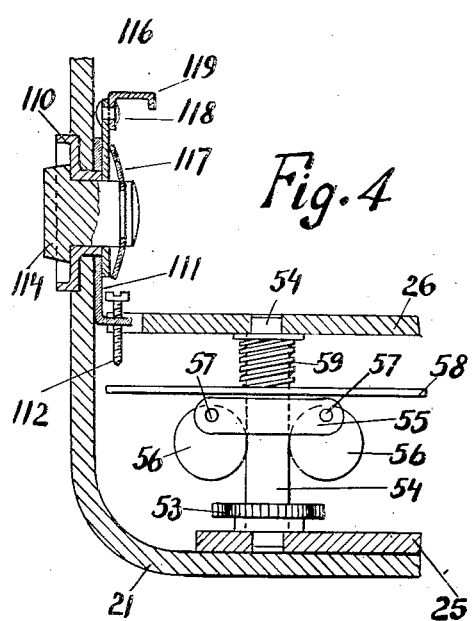

A feature of the invention is to provide in a motion picture camera an exposure meter which automatically provides for proper exposure of the film. Yet another feature is the construction of an exposure meter including an optical wedge filter in combination with a pair of mirrors. Still another feature is to provide an exposure meter which may be readily adjusted for the speed of the camera, the type of film used and for external light conditions. Other features and advantages will appear from the following specification and drawings, in which:

Figure 1 is a front elevational view of the camera; Fig. 2 is a side elevational view thereof; Fig. 3 is a side elevational view of the spring-motor assembly in the camera; Fig. 4 is a fragmentary detail sectional view taken along the line 4—4 of Fig. 1; Fig. 5 is a vertical sectional view taken along the line 5—5 of Fig. 2; Fig. 6 is a fragmentary detail sectional view taken along the line 6—6 of Fig. 1; Fig. 7 is a fragmentary detail sectional view similar to the view of Fig. 6 showing a modification of the device; Fig. 8 is a transverse sectional view taken along the line 8—8 of Fig. 1; Fig. 9 is a fragmentary detail elevational view of the front of the camera, the cover plate being removed; Fig. 10 is a fragmentary detail sectional view taken along the line 10—10 of Fig. 3.

In the specific embodiment of the invention described herein, the camera is enclosed in a housing 21 and includes a springmotor assembly A and an exposure meter assembly B. A lens 22 (Fig. 1) is suitably positioned with respect to the housing.

As seen particularly in Fig. 3, the springmotor assembly A is mounted between two flat plates 25 and 26 (note also Fig. 10) which are disposed within the housing 21 on opposite sides thereof. A driving spring 140 is wound around a shaft 27 within a casing 28 and is secured at one end to the casing 28 by any suitable means. A large gear 29 is fixedly mounted on the casing 28 and rotates with the same. The shaft 27 serves as a mounting for a ratchet 30 which is engaged by a pawl 31, a spring 32 being arranged to continuously urge the pawl into engagement with the ratchet. The pawl and ratchet mechanism prevents the rotation of the shaft 27 in one direction. The spring 32 may be mounted in any suitable means and is preferably attached to the plate 26 by a pair of screws 141.

The large gear 29 meshes with a pinion 33 pressed on a shaft 34. The plates 25 and 26 are equipped with registering holes which serve as bearings for the ends of the shaft 34. Similar additional apertures (not shown) in the plates 25 and 26 support the other shafts of the springmotor assembly.

A gear 35 fixedly mounted on the shaft 34 drives a pinion 36 and the shaft 37 on which the pinion is mounted. A spiral gear 38 is also connected to the shaft and engages spiral gears 39 and 41. The spiral gear 39 is rotatably mounted on a pin 142 secured to a turned-up portion of plate 25, and supports at its end a rotating shutter 40. The other spiral gear 41 drives a shaft 42.

The shaft 42 extends through the plate 26 and is equipped at its end with a disc 45 which forms part of the film transporting mechanism not here shown in detail, but a portion of a claw mechanism being shown in Fig. 3.

An elongated depending claw 48 which is used to transport the film in the camera, is engaged by a screw 47. The lower portion of the claw 48 is provided with a slot 143 which is guided in a groove of a pin 49, the pin 49 being mounted on the plate 26. Rotation of the shaft 42 and the disc 45 thereon causes the upper portion of the claw 48 to traverse a substantially elliptical path which is similar in shape to the letter D.

The claw 48 is equipped at its upper portion with a finger 144 which is adapted to engage the film and to transport the same. Rotation of the shaft 42 in a clockwise direction (as shown in the arrangement in Fig. 3) causes the finger 144 to engage the film in the downward portion only of the movement of the finger. In this manner the film is advanced step by step in a single direction. The distance between the highest and lowest points of the movement of the claw finger 144 should be at least equal to the distance between the standard perforations in the film.

Referring once more to Fig. 3, the gear 35 also meshes with a pinion 50 on a shaft 51. A second gear 52 is connected with the shaft 51 by an over-running friction clutch (not shown) of the usual construction. The gear 52 engages a pinion 53 on a shaft 54 of the governor assembly shown in Fig. 4.

The speed governing assembly includes a frame 55 which is fixed on the shaft 54 and a pair of weights 56 depending from the frame 54 and pivotally secured thereto by the pins 57. A disc 58 is slidably received around the shaft 54 above the frame 55 and is urged toward the frame by a spiral spring 59. The disc 58 is thus engaged by the weights 56 when the shaft 54 is rapidly rotated. The weights are urged into engagement with the disc by centrifugal force and press the disc upwardly against the force of the spring 59 until it is engaged by stop members which are hereinafter described.

As seen particularly in Figs. 3 and 10 the gear 29 engages a gear 60 which is rotatably mounted on a shaft 61. A second gear 62 fixedly attached to the shaft 61 is connected to the gear 60 by a spring 63 which acts as a friction clutch. The gear 62 in turn engages a gear 64 on a shaft 65, thus rotating the shaft 65.

Referring again to Fig. 3, a pair of gears 75 and 76 on a shaft 77 are engaged and driven by the gears 60 and 78 respectively. The gears 69 and 78 in turn are driven by the large gear 29. The gears 75 and 76 are rotatably mounted on the shaft 77 and are equipped with a slightly different number of teeth in order that when the springmotor assembly is in motion the gear 75 will lag slightly behind the gear 76 in rotation. A dial 79 (Fig. 2) is connected with the gear 75 and by cooperation with the pointer mark 80 shows the number of feet of film exposed in the camera. Since constructions of this type are well known, this construction is not described in further detail herein. A key 81 secured to the shaft 27 from the outside of the housing 21 permits the winding of the spring in the springmotor assembly A.

A button 85 (Fig. 1) controls the operation of the springmotor assembly. A threaded opening 89 is provided in the housing 21 in which a cable release may be mounted. Since cable releases are well known in construction it is not believed necessary to show or describe the same herein.

The exposure meter assembly B, as seen particularly in Figs. 5, 6, 7, 8 and 9, is designed to automatically provide the correct time of exposure and is cooperatively arranged with the diaphragm of the lens 22. The exposure meter assembly B includes a filter of variable and known density to the transmission of light. This filter is placed in the path of the light and adjusted to the point at which the last detail of objects observed by the user vanishes. The filter as shown is preferably a gray, colorless optical wedge 97 arranged along the curved surface of a cylinder and supported by a disc 90 rotatably mounted on a screw 91 in the housing 21. The housing 21 is equipped with an opening 154 in which is placed a plate 92 of ground glass or other translucent material. Any suitable means such as the plate 93 may be used to support the ground glass plate in position. The plate 93 preferably is arranged to support in addition a front lens 94 of a view finder of conventional construction.

Light is received on the translucent plate 92 and passes through the same to the mirror 95 from which it is reflected to a window 155 in a plate 96. The window 155 is preferably provided with a hair line or other mark thereon. The light passing through the window 155 passes through the optical wedge 97 and is again reflected by the mirror 98 to the opening 99 in the housing 21. If desired, a lens 100 may be mounted in the housing 21 to serve as a magnifying glass and provide the observer with a larger view of the optical wedge 97. In a similar manner, the rear lens 101 of the view finder is mounted in an opening 102 in the housing 21.

In the modification of the invention shown in Fig. 7, the rear lens of the view finder is used as a magnifying glass in the exposure meter. However, in this event it is necessary to provide means to darken the image of the view finder when the exposure meter is to be used since the relatively great brightness of the view finder would prevent accurate measurement through the optical wedge 97. For this purpose, a dark filter 103 mounted on a frame 104 rotatably connected to a separating plate 105 may be provided. The frame 104 is rotatable about the shaft 106 and may be raised to a position (as shown in Fig. 7) wherein the light passing through the view finder is intercepted. When the view finder is to be used, the frame 104 may be lowered to the position shown in dotted outline in Fig. 7. A knob 107 (Fig. 2) is provided for the operation and movement of this frame.

Referring again to Figs. 4, 5, 8 and 9, the rotation of the optical wedge 97 is accomplished by a mechanism which includes the gear 108 pressed on the disc 90. This gear meshes with a larger gear 109, the position of which will depend on the factors regulating the exposure of the film, for example, the sensitivity of the film used, the speed of the shutter, and the aperture of the lens.

The shutter speed is adjusted by means of the knob 110 (Figs. 1 and 4). This knob 110 is mounted in a hole in the housing 21 and supports at its inside end a plate 111. Three screws 112 are secured to the plate 111, the ends of the screws being adapted to engage the disc 58 and serve as stop members therefor. By adjusting the depth of these screws the position of the governor disc may be controlled and the speed of the whole driving mechanism including the claw 48 and shutter 40 may be regulated. Preferably, the screws are arranged to provide for predetermined speeds; for example, 8, 16 and 64 picture frames per second respectively. On the knob 110 are a pair of scales 156 and 157, the upper scale 156 being adapted to indicate the shutter speed by placing the indicated number in registry with a mark 113 on the housing 21 (Fig. 1). The scale 157 is arranged to indicate the sensitivity of the film which is used. The knob 110 is equipped with a concentric opening in which a second knob 114 is received. The knob 114 is provided on its front face with a mark 115 which may be brought into registry with any of the numbers on the scale 157.

The knob 114 can be turned without movement of the knob 110 if the film sensitivity is changed. However, because of the friction between the two knobs, rotation of the knob 110 does not change the relative positions of the knobs with respect to each other. A plate 116 equipped with an eccentric opening is attached to the knob 110 and pressed against the plate 111 by a slotted spring washer 117 which provides the necessary friction.

As seen particularly in Figs. 5 and 8, the plate 116 is attached to a connecting rod 119 by a rivet 118, thereby transmitting the motion of the knob 110 and 114 to a lever 120. The lever 120 in turn is connected to a gear 121 rotating on the same shaft which supports the gear 109, both gears being rotatably mounted on the shaft. A third gear 122 positioned between the gears 109 and 121 is fixedly secured to the shaft 123. A pinion 124 on the gear 109 engages the gear 121 while another pinion 125 on the gear 109 meshes with the gear 122. In this manner, due to the differential action of the gears 121 and 122, the large gear 109 is driven in a movement which is equal to the arithmetic means of the motions of the smaller gears 121 and 122. The motion of the gear 109 is then directly transmitted to the gear 108 and the optical wedge 97. Thus, this differential gear mechanism causes rotation of the optical wedge 97 as a result of movement of the diaphragm regulating means, the shutter speed control and the film sensitivity adjustment.

Referring now to Fig. 9, the shaft 123 extends through the wall of the casing 21 and is equipped at its outer end with a lever 126. A pin 127 on the end of the lever 126 is received within a slot of an angle lever 128, a screw 129 serving as the pivot therefor. A pin 130 in the other end of the angle lever 128 is received within a curved slot 131 in a disc 132, the disc 132 being fixedly attached to the diaphragm ring (not shown) of the lens. A knob 133 on an extension of the disc 132 enables the operator to move the diaphragm and thus the whole mechanism of the exposure meter without danger of touching the lens 22.

Rotation of the disc 132 from the position shown in solid lines in Fig. 9 to the position shown in dotted lines therein moves the slot 131 into the position shown in dotted lines and in turn moves the angle lever 128 and the small lever 126 into the indicated position. The small lever 126 turns the shaft 123 and the gear 122 inside the casing, thus, through the action of the differential gears 121 and 122 moving the large gear 109 and the optical wedge 97.

With the construction shown, it is possible to arrange the diaphragm disc 132 in proper position by the use of the optical wedge 97. If the film sensitivity and shutter speed have been previously adjusted and the exposure meter calibrated, the position of the diaphragm disc 132 in which the optical wedge just completely darkens the view is the proper exposure. In other words, the operator need only set the dials 110 and 114 according to the film sensitivity and shutter speed respectively and then turn the knob 133 on the diaphragm disc 132 until the mark in the window 155 as seen through the optical wedge has completely disappeared.

If it is desired to use several interchangeable lenses in the same camera, the exposure meter can be adjusted accordingly by merely substituting for the plate 132 another plate having a slot 131 of a shape to correspond to the new lens which is to be used. It is apparent that instead of the curved slot arrangement in the plate 132, any suitable means for transmitting the motion of the diaphragm to the shaft 123 may be substituted.

*Operation*

The knobs 110 and 114 are adjusted for the appropriate film sensitivity and shutter speed respectively. The object to be photographed is then observed by the user through the view finder, the view finder comprising the lenses 94 and 102. With the camera focused on the object to be photographed, the observer then looks through the lens 99 and moves the lever 133 downwardly until the hair line 163 in the window 155 just disappears from his view. At this point, the proper diaphragm opening is reached for the particular conditions under which the picture is to be taken. The springmotor assembly A is set in operation by pressing inwardly the button 85. The shutter 40 is rotated by the shaft on which the worm gear 39 is mounted. The other worm gear 41 causes reciprocal movement of the claw 48 of which the finger 144 engages the perforations in the film 161 to transport the same across the path of light entering the camera through the lens 22.

The modification shown in Fig. 7 relates to a combined view finder and exposure meter. In this structure the observer looks through a single lens which receives light from the view finder lens 94 and exposure meter lens 92. When the exposure meter is to be used, the beam of light passing through the view finder lens 94 is intercepted by the plate 103. By rotating the knob 107 with the plate 103 in intercepting position, the light received from the view finder lens 94 does not interfere with the operation of the exposure meter. When the proper exposure is obtained the plate 103 may be lowered from intercepting position and the camera accurately focused through the view finder.

While in the foregoing description, we have set forth certain details and certain modifications as illustrative of the invention, it will be understood that such details and modifications may be varied widely by those skilled in the art without departing from the spirit of our invention.

We claim:

1. In a camera of the character described, a casing, a lens supported in said casing, whereby to permit a light beam passing through said lens into said casing, a film intercepting said light beam, means including diaphragm and shutter controls for regulating the quantity of light received by said film, means providing a second light beam passing into said casing, a mirror for receiving and reflecting said second light beam, an indicator mark in the path of said second light beam, a light filter in the form of a cylindrical optical wedge intercepting said second light beam, different portions of said filter having different capacities for the transmission of light, a window in said casing for observing the quantity of light transmitted by said filter, a mirror positioned within said optical wedge for reflecting light from said filter to said window, means for rotating said filter to bring different portions thereof into intercepting position with respect to said second light beam, and a differential gear mechanism for connecting said filter and said regulating means, said gear mechanism being arranged with respect to the position of said filter so that the proper exposure for the film is obtained at the point of rotation of the filter where the indicator mark becomes invisible to the observer.

2. In a camera of the character described, a casing, a lens supported in said casing, whereby to permit a light beam passing through said lens into said casing, a film intercepting said light beam, means for regulating the quantity of light received by said film, means providing a second light beam passing into said casing, a light filter adapted to intercept said light beam, different portions of said filter having different capacities for the transmission of light, means for moving said filter to bring different portions thereof into intercepting position with respect to said second light beam whereby a predetermined quantity of light is transmitted thereby, means for adjusting the position of said filter according to the sensitivity of said film, means for adjusting the position of said filter according to the time of exposure of said film, and means for connecting said filter in differential drive relation with said regulating means and film sensitivity adjusting means whereby the position of said filter is determined by said film sensitivity adjusting means and said regulating means.

3. In a camera of the character described, a casing, a lens supported in said casing, whereby to permit a light beam passing through said lens into said casing, a film intercepting said light beam, means for regulating the quantity of light received by said film, means providing a second light beam passing into said casing, a light filter intercepting said light beam, different portions of said filter having different capacities for the transmission of light, means for moving said filter to bring different portions thereof into intercepting position with respect to said second light beam, means for connecting said filter in drive relation with said regulating means whereby the position of said filter is determined by said regulating means, a view finder window in said casing adjacent said filter, a single window in the opposite side of said casing for the observing of said view finder and said filter, and means for intercepting the light from said view finder window.

4. In a camera of the character described, an exposure meter mechanism comprising a light filter in the form of an optical wedge, different portions of said filter having different capacities for the transmission of light, a differential gear mechanism for rotating said wedge, means for regulating the diaphragm opening in said camera, said means being cooperatively arranged with said mechanism to drive the same, and means for changing the shutter speed of said camera, said last-mentioned means being arranged to actuate said gear mechanism.

5. In a camera of the character described, an exposure meter mechanism comprising a light filter in the form of an optical wedge, different portions of said filter having different capacities for the transmission of light, a differential gear mechanism for rotating said wedge, means for regulating the diaphragm opening in said camera, said means being cooperatively arranged with said mechanism to drive the same, an independent mechanism for operating said gear mechanism, movable means for changing the shutter speed of the camera, and movable means adapted to be adjusted in position according to the sensitivity of the film in said camera, each of said movable means being arranged to actuate said independent mechanism.

6. In a camera of the character described, an exposure meter mechanism comprising a casing, means in said casing for providing a light path therethrough, a light filter in the form of a cylindrical optical wedge intercepting said light path, different portions of said filter having different capacities for the transmission of light, means for regulating the diaphragm opening in said camera, a gear driven by the movement of said regulating means, a shaft supporting said gear, a pair of additional gears rotatably mounted on said shaft, one of said pair of gears being connected in drive relation with said wedge whereby rotation of the gear produces rotation of the wedge, a pair of pinion gears rotatably mounted on one of said gears, one of said pinion gears being arranged to mesh with the other of said pair of gears and the other pinion gear being arranged to mesh with said first-mentioned gear, said pinion gears being arranged in meshing relation with each other, mechanism for driving the other of said pair of gears, movable means for changing the shutter speed of the camera, and movable means adapted to be adjusted in position according to the sensitivity in said camera, each of said movable means being arranged to actuate said driving mechanism.

7. In a camera of the character described, an exposure meter mechanism comprising a casing, means in said casing for providing a light path therethrough, a light filter in the form of a cylindrical optical wedge intercepting said light path, different portions of said filter having different capacities for the transmission of light, a differential gear mechanism for rotating said wedge to bring different portions thereof into intercepting position with respect to said light path, means for regulating the diaphragm opening in said camera, said means being cooperatively arranged with said gear mechanism to drive the same, lever means for independently driving said gear mechanism, manually movable means connected to said lever means to operate the same, said means being adapted to be adjusted in position according to the sensitivity of the film in said camera, and movable means for changing the shutter speed of the camera, said changing means being arranged in frictional engagement with said manually movable means whereby movement of said changing means produces a corresponding movement of said manually movable means.

8. The combination in a motion picture camera having the usual lens, diaphragm, shutter, film transporting and spring motor mechanism, of a coupled exposure meter for the automatic adjustment of diaphragm opening and film exposure time determined by the numer of frames exposed per second and the automatic correction for film speeds, said assembly including an optical wedge in the form of a cylinder, said optical wedge having portions successively disposed to have different capacities to transmit light, means providing a light beam directed through said optical wedge so as to be visible exteriorly of the camera, an adjusting gear concentric with the cylinder comprising said optical wedge, said gear and cylinder mounted to rotate together, a shaft, a driving gear meshing with said adjusting gear and rotatably supported on said shaft, a second gear rotatably supported on said shaft, a gear fixed on said shaft between said driving gear and second gear, pinions carried by said driving gear and second gear, respectively, both meshing with said fixed gear, said pinions having a different number of teeth so as to place said second gear in differential drive relation with said driving gear, a rotatable button on the camera for adjusting the spring motor mechanism including the shutter to a desired number of frames per second, a link mechanism including levers carried by said second gear and rotatable button, and an interconnecting rod whereby to rotate said second gear and optical wedge as an incident to setting the camera for the desired number of frames per second, a lever mechanism concentric with the camera lens for adjusting the diaphragm opening, a pivoted bell crank lever having one arm connected through a cam mechanism to said lever mechanism, a lever fixed on said shaft carrying said intermediate gear, and a slide connection between said lever and the second arm of said bell crank lever whereby to turn said shaft, fixed gear, driving gear and optical wedge as an incident to adjusting the diaphragm opening by said lever mechanism.

9. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an adjustably mounted optical wedge having portions successively disposed to have different capacities to transmit light, means providing a light beam directed through said optical wedge so as to be visible exteriorly of the camera, an adjusting gear connected to move said optical wedge, a shaft, a driving gear meshing with said adjusting gear and rotatably supported on said shaft, a second gear rotatably supported on said shaft, a gear fixed on said shaft between said driving gear and second gear, pinions carried by said driving gear and second gear both meshing with said fixed gear, said pinions having a different number of teeth so as to place said second gear in differential drive relation with said driving gear, a rotatable button on the camera for adjusting the spring motor mechanism including the shutter to a desired number of frames per second, a link mechanism including levers carried by said second gear and rotatable button, and an interconnecting rod whereby to rotate said second gear and adjust the position of said optical wedge as an incident to setting the camera for the desired number of frames per second, a lever mechanism concentric with the camera lens for adjusting the diaphragm opening, a pivotal bell crank lever having one arm connected through a cam mechanism to said lever mechanism, a lever fixed on said shaft carrying said intermediate gear, and a slide connection between said lever and the second arm of said bell crank lever whereby to turn said shaft, fixed gear, and driving gear to adjust the position of said optical wedge as an incident to adjusting the diaphragm opening by said lever mechanism.

10. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an adjustable member forming a part of an exposure meter, an adjusting gear connected to said adjustable member, a shaft, a driving gear meshing with said adjusting gear and rotatably supported on said shaft, a second gear rotatably supported on said shaft, a gear fixed on said shaft between said driving gear and second gear, pinions carried by said driving gear and second gear both meshing with said fixed gear, said pinions having a different number of teeth so as to place said second gear in differential drive relation with said driving gear, a rotatable button on the camera for adjusting the spring motor mechanism including the shutter to a desired number of frames per second, a link mechanism including levers carried by said second gear and rotatable button, and an interconnecting rod whereby to rotate said second gear and adjusting gear as an incident to setting the camera for the desired number of frames per second, a lever mechanism concentric with the camera lens for adjusting the diaphragm opening, a pivoted bell crank lever having one arm connected through a cam mechanism to said lever mechanism, a lever fixed on said shaft carrying said intermediate gear, and a slide connection between said lever and the second arm of said bell crank lever whereby to turn said shaft, fixed gear, and driving gear as an incident to adjusting the diaphragm opening by said lever mechanism.

11. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an optical wedge in the form of a cylinder, said optical wedge having portions successively disposed to have different capacities to transmit light, means providing a light beam directed through said optical wedge so as to be visible exteriorly of the camera, an adjusting gear concentric with the cylinder comprising said optical wedge, said gear and cylinder mounted to rotate together, a shaft, a driving gear meshing with said adjusting gear and rotatably supported on said shaft, a second gear rotatably supported on said shaft, a gear fixed on said shaft between said driving gear and second gear, pinions carried by said driving gear and second gear both meshing with said fixed gear, said pinions having a different number of teeth so as to place said second gear in differential drive relation with said driving gear, a rotatable button on the camera for adjusting the spring motor mechanism including the shutter to a desired number of frames per second, a link mechanism including levers carried by said second gear and rotatable button, and an interconnecting rod whereby to rotate said second gear and optical wedge as an incident to setting the camera for the desired number of frames per second, means associated with the camera lens for adjusting the diaphragm opening, and a drive connection between said diaphragm adjusting means and adjusting gear, independent of said link mechanism, for adjusting the position of said optical wedge concomitantly with the adjusting of the diaphragm opening.

12. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an optical wedge in the form of a cylinder, said optical wedge having portions successively disposed to have different capacities to transmit light, means providing a light beam directed through said optical wedge so as to be visible exteriorly of the camera, an adjusting gear concentric with the cylinder comprising said optical wedge, said gear and cylinder mounted to rotate together, a shaft, a driving gear meshing with said adjusting gear and rotatably supported on said shaft, a second gear rotatably supported on said shaft, a gear fixed on said shaft between said driving gear and second gear, pinions carried by said driving gear and second gear both meshing with said fixed gear, said pinions having a different number of teeth so as to place said second gear in differential drive relation with said driving gear, means extending exteriorly of the camera for adjusting the spring motor mechanism including the shutter to a desired number of frames per second, a link mechanism including levers carried by said second gear and rotatable button, and an interconnecting rod whereby to rotate said second gear and optical wedge as an incident to setting the camera for the desired number of frames per second, means also extending exteriorly of the camera for adjusting the position of the optical wedge for film speeds, said film speed adjusting means normally moving with said spring motor adjusting means but having a friction connection to drive said link mechanism when moved alone, thereby to provide means for correcting the position of the optical wedge for film speed, mechanism associated with the camera lens for adjusting the diaphragm opening, a pivoted bell crank lever, a lever fixed on said shaft carrying said intermediate gear, connection between said lever and one arm of said bell crank lever and a connection between said diaphragm adjusting mechanism and a second arm of said bell crank lever whereby to make effective simultaneous adjustment of the diaphragm and optical wedge.

13. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an optical wedge in the form of a cylinder, said optical wedge having portions successively disposed to have different capacities to transmit light, means providing a light beam directed through said optical wedge so as to be visible exteriorly of the camera, an adjusting gear concentric with the cylinder comprising said optical wedge, said gear and cylinder mounted to rotate together, a rotatable member extending exteriorly of the camera for adjusting the spring motor mechanism including the shutter to a desired number of frames per second, a link mechanism including two pivoted levers, and an interconnecting rod, a connection to rotate one of said levers by said rotatable member, a differential gear connection between the second lever and said adjusting gear, a second rotatable member for adjusting for film speeds, said second rotatable member being frictionally connected to the first mentioned rotatable member to turn alone if engaged by the operator, but normally turning with the said first mentioned rotatable member, said second rotatable member having a friction connection to drive said second lever of the link mechanism when moved alone whereby to adjust the setting of the optical wedge to correct for film speeds, a mechanism associated with the camera lens for adjusting the diaphragm opening, and means including said differential connection for rotating the optical wedge simultaneously with the movement of said diaphragm adjusting means without affecting the adjustment of said first or second mentioned rotatable member.

14. The combination in a motion picture camera having the usual lens, diaphragm, shutter, film transporting and spring motor mechanism, of a coupled exposure meter for the automatic adjustment of diaphragm opening and film exposure time determined by the number of frames exposed per second and the automatic correction for film speeds, said assembly including an adjustable optical wedge, said optical wedge having portions successively disposed to have different capacities to transmit light, means providing a light beam directed through said optical wedge so as to be visible exteriorly of the camera, an adjusting gear for controlling the position of said optical wedge, a shaft, a driving gear meshing with said adjusting gear and rotatably supported on said shaft, a second gear rotatably supported on said shaft, a gear fixed on said shaft between said driving gear and second gear, pinions carried by said driving gear and second gear both meshing with said fixed gear, said pinions having a different number of teeth so as to place said second gear in differential drive relation with said driving gear, a rotatable member on the camera for adjusting the spring motor mechanism including the shutter to a desired number of frames per second, means responsive to rotation of said rotatable member for rotating said second gear as an incident to setting the camera for the desired number of frames per second whereby to impart differential movement to said adjusting gear, a second rotatable member concentric with the first rotatable member for adjusting for film speeds, said second rotatable member frictionally connected to the first mentioned rotatable member to turn alone if engaged by the operator, but normally turning with the said first rotatable member, said second rotatable member having a friction connection to drive said second gear when moved alone whereby to adjust the setting of the optical wedge to correct for film speeds, mechanism for adjusting the camera diaphragm opening, and a connection therefrom to turn said shaft and fixed gear, whereby to adjust the position of the optical wedge as an incident to adjusting the diaphragm opening.

LEO FRANKEL.
ULRICH R. FURST.